United States Patent
Lanphear

(12) 
(10) Patent No.: US 6,968,387 B2
(45) Date of Patent: Nov. 22, 2005

(54) STOCHASTIC ADAPTIVE STREAMING OF CONTENT

(75) Inventor: Damon Lanphear, Vashon Island, WA (US)

(73) Assignee: RealNetworks, Inc., Seattle, WA (US)

( * ) Notice: Subject to any disclaimer, the term of this patent is extended or adjusted under 35 U.S.C. 154(b) by 131 days.

(21) Appl. No.: 10/340,105

(22) Filed: Jan. 10, 2003

(65) Prior Publication Data

US 2004/0139215 A1 Jul. 15, 2004

(51) Int. Cl.$^7$ ............................................. G06F 13/00
(52) U.S. Cl. ...................... 709/231; 709/219; 709/224; 709/232
(58) Field of Search ................................. 709/219, 224, 709/231, 232, 203, 217, 223, 238

(56) References Cited

U.S. PATENT DOCUMENTS

| | | | | |
|---|---|---|---|---|
| 5,583,792 A | * | 12/1996 | Li et al. ...................... 709/224 |
| 5,838,663 A | * | 11/1998 | Elwalid et al. .............. 370/233 |
| 6,185,636 B1 | * | 2/2001 | Hough ......................... 710/34 |
| 6,269,078 B1 | * | 7/2001 | Lakshman et al. .......... 370/230 |
| 6,480,902 B1 | * | 11/2002 | Yuang et al. ................ 709/248 |
| 6,625,655 B2 | * | 9/2003 | Goldhor et al. ............. 709/231 |
| 6,665,751 B1 | * | 12/2003 | Chen et al. ................... 710/52 |
| 6,678,332 B1 | * | 1/2004 | Gardere et al. ......... 375/240.26 |
| 6,757,273 B1 | * | 6/2004 | Hsu et al. .................... 370/349 |
| 2002/0162111 A1 | * | 10/2002 | Shimizu et al. ................ 725/87 |
| 2003/0067872 A1 | * | 4/2003 | Harrell et al. ............... 370/229 |
| 2003/0123392 A1 | * | 7/2003 | Ruutu et al. ................. 370/235 |
| 2003/0198184 A1 | * | 10/2003 | Huang et al. ................ 370/231 |
| 2004/0128396 A1 | * | 7/2004 | Patrick et al. ............... 709/231 |

OTHER PUBLICATIONS

Vignaus, G.A., "M/M/1 Queues," http://www.mcs.vuw.ac.nz/~vignaux/docs/mm1.html, Revision: 3.13, printed Jan. 10, 2003, 17 pgs.

* cited by examiner

*Primary Examiner*—Viet D. Vu
(74) *Attorney, Agent, or Firm*—Schwabe, Williamson & Wyatt, P.C.

(57) ABSTRACT

Content is streamed from a providing device to a receiving device, where the content is successively buffered in a receiving buffer, and then successively removed for processing. Periodically, the likelihood of the receiving buffer becoming empty or reaching an unacceptable low threshold is assessed, and the streaming rate is adapted based on the result of the determination. In one embodiment, a probability is computed, modeling the packet arrival into the receiving buffer and removal as Markovian input and output processes respectively, and the receiving buffer as a single channel queue. In one embodiment, the likelihood is determined by the content providing device, based at least in part on feedback information from the content receiving device, and the streaming rate is stochastically adapted accordingly.

46 Claims, 6 Drawing Sheets

Receiver Report  400

| extended highest sequence number received ~402 | cumulative number of packets lost ~404 | | | | | |
|---|---|---|---|---|---|---|
| | | | | | | |

Figure 4

STOCHASTIC ADAPTIVE STREAMING OF CONTENT

FIELD OF THE INVENTION

The present invention relates to the field of content streaming. More specifically, the present invention is related to adaptive content streaming.

BACKGROUND OF THE INVENTION

Advances in microprocessor, networking and related technologies have led to wide spread deployment and adoption of server-client based applications. In particular, with the advance of high speed public networks, such as the Internet, increasing amounts of rich content are being served and available for consumption by networked clients. Much of these rich contents are streamed to the client devices for consumption.

While significant advances have been made in networking and related technologies, unless some forms of bandwidth reservation are employed, delivery of content over high speed, best effort networks, such as the Internet, still remains a bit unpredictable, due to varying network conditions.

To minimize the manifestation of these "glitches", and improve user experience, i.e. continuity, as well as visual and aural fidelity, typically a receiving buffer is employed at the receiving client device to buffer received packets of the content stream and to ensure ample content is available for the decoder of the receiving client device. Moreover, content is encoded for delivery and decoding at different streaming rates (i.e. data rates). In some applications, delivery at a selected one of the streaming/data rates is dynamically adapted based on network conditions, as measured by one or more metrics, such as packet drop rates and so forth.

In practice, deciding when to cue adaptive selection of alternate streaming/data rate based on network conditions has turned out to be a relatively difficult task. Determination has to be made as to what attributes of the distribution quality should be measured, and how they should be measured, to provide the most accurate signal for the adaptation process. Preferably, the solution is scalable, and applies to existing content distribution techniques.

Experience has shown that the various prior art techniques provide acceptable, but not consistently satisfactory performance. Thus, an improved approach to adaptive streaming of content is desired.

BRIEF DESCRIPTION OF THE DRAWINGS

The present invention will be described by way of exemplary embodiments, but not limitations, illustrated in the accompanying drawings in which like references denote similar elements, and in which:

FIG. 4 illustrates an example feedback from a receiver device, in the form of a "receiver report", in accordance with one embodiment.

DETAILED DESCRIPTION OF EMBODIMENTS OF THE INVENTION

The present invention includes components of content provider and receiver devices, methods of operations practiced thereon, systems so formed, and other related subject matters.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Terminology

Parts of the description will be presented in content streaming and queuing theory terminology, such as packets, encoding, decoding, arrival, departure, receiving, removal and so forth, consistent with the manner commonly employed by those skilled in the two arts to convey the substance of their work to others skilled in the respective arts. These terms are well understood by those skilled in the respective arts. In particular, in a content provider or receiver device, the content and associated data may take the form of electrical, magnetic, or optical signals capable of being stored, transferred, combined, and otherwise manipulated through electrical and/or optical components of a processor, and its subsystems.

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

System View

Figure 1:
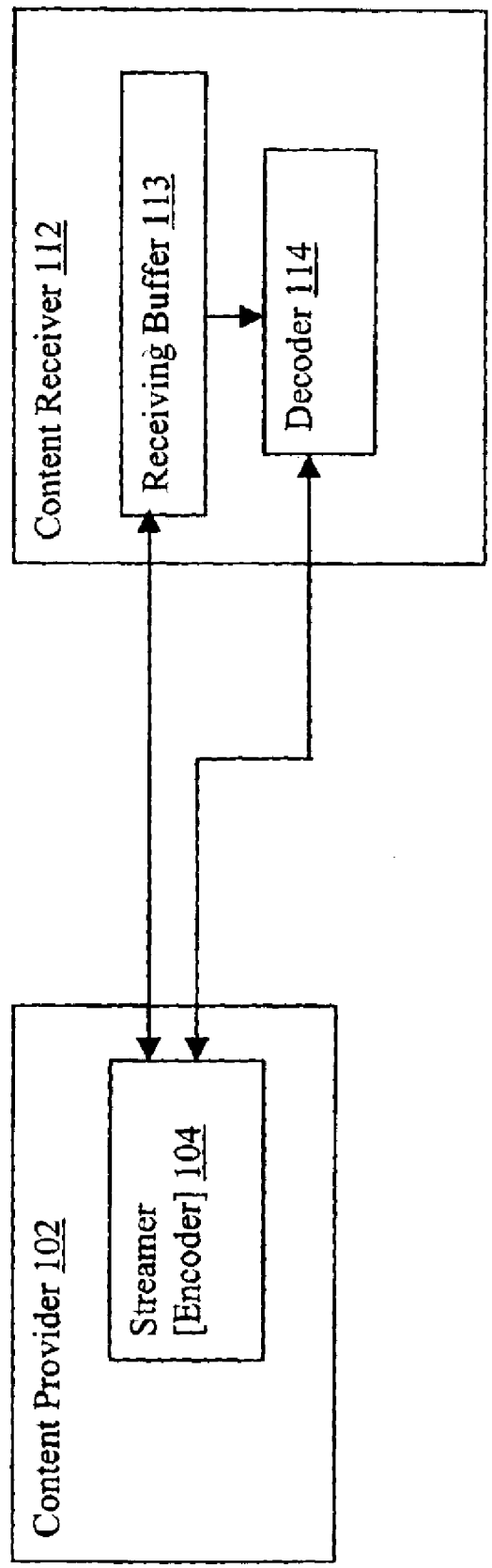
FIG. 1 illustrates a system having a content provider and a receiver device incorporated with the teachings of the present invention, in accordance with one embodiment.

FIG. 1 illustrates a system view of the present invention, in accordance with one embodiment. As illustrated, content provider 102 equipped with streamer 104 is coupled to receiver device 112 having buffer 113 and decoder 114, and provides receiver device 112 with streaming content. Streamer 104 may e.g. include an encoder for encoding the content being streamed to receiver device.

Content is encoded for streaming at different streaming rates, and provider 102 is equipped to dynamically adapt to a higher or a lower streaming rate as desired. The streaming rates are application dependent, and the present invention may be practiced with any streaming rate.

Receiver device 112 employs buffer 113 to buffer the received content, to ensure decoder 114 having adequate content for processing to effectuate the desired continuous uninterrupted experience of the provided content. In one embodiment, the content is provided in packet forms, buffered successively, and the buffered packets are then successively removed from buffer 113 for processing.

In accordance with the present invention, the system is equipped with the ability to determine a likelihood of buffer 113 becoming empty, and the ability to adapt the streaming rate based at least in part on the result of the likelihood determination. The likelihood of buffer 113 becoming empty is a relevant factor in adapting the streaming rate, because the event may be indicative of the rate at which the network is delivering the content is inappropriate for the decode rate required to present the content to the user.

In alternate embodiments, the present invention may also be practiced with the system being equipped to determine a likelihood of buffer 113 reaching an unacceptable low threshold, as opposed to becoming empty, and the ability to adapt the streaming rate based at least in part on the result of that likelihood determination. What constitutes an unacceptable low threshold is typically application and/or risk tolerance dependent. Preferably, the threshold is configurable.

As will be apparent from the description to follow, the determination of likelihood of buffer 113 becoming empty (or reaching the unacceptable low threshold) may be determined by either receiver device 112 or content provider 102. In the former case, receiver device 112 informs content provider 102 of the result of the determination and/or the necessity or suggestion to adapt. In the latter case, receiver device 112 provides feedback to content provider 102, which performs the likelihood determination based at least in part on the feedback.

As will be described in more detail below, in one embodiment, the likelihood is determined by determining a probability of buffer 113 becoming empty (or reaching the unacceptable low threshold). The streaming rate is adapted to a lower rate, if the probability is higher than a "ceiling" operational probability threshold, and adapted to a higher rate, if the probability is lower than a "floor" operational probability threshold. Preferably, the probability thresholds are also configurable, and the configuration may be performed at installation/setup, initialization or even in real time, during operation. The configuration/re-configuration may be performed using any one of a number of techniques known in the art, e.g. programmable registers.

As will be also described in more detail below, in one embodiment, the probability is determined employing a stochastic model, modeling the arrival and removal of the packets in and out of buffer 113 as Markovian input and output processes respectively, and buffer 113 as a single channel queue. In other words, the buffering operation is modeled as a M/M/1 queue, in the terminology of queuing theory. In alternate embodiments, buffer 113 may be modeled in employing other modeling techniques.

Content may be any one of a number of types of rich content known in the art, including but not limited to audio, video, graphics, and combinations thereof.

Content provider and receiver devices 102 and 112 may be any one of a number of content providing and receiving devices known in the art. Content provider 102 may e.g. be a video server, an audio server, or both. Content receiving device 112 may e.g. be a daughter card, a motherboard, a palm sized computing device, a wireless mobile phone, a digital personal assistant, a laptop computing device, a desktop computing device, a set-top box, a server, a compact disk player, a digital versatile disk player, a television, or a display monitor.

Buffer 113 may be implemented using any one of a number of volatile or non-volatile storage medium, including but are not limited to disk, flash memory, dynamic random access memory (DRAM), and electrically erasable programmable read only memory (EEPROM). Receiving comprises "writing" a received packet into buffer 113, and removal comprises "reading" a buffered packet out of buffer 113.

Content provider 102 and receiver 104 may be coupled to each other via a wired or a wireless connection. The connection may e.g. be a bus connection, such as the Universal Serial Bus (USB), the Peripheral Component Interconnect (PCI) bus, or other buses. The connection may e.g. also be a local or wide area networking connection, such as an Ethernet, a Token Ring, Transmission Control Protocol/Internet Protocol (TCP/IP) or other networking protocols/transports of like kind.

Method View

Figure 2:
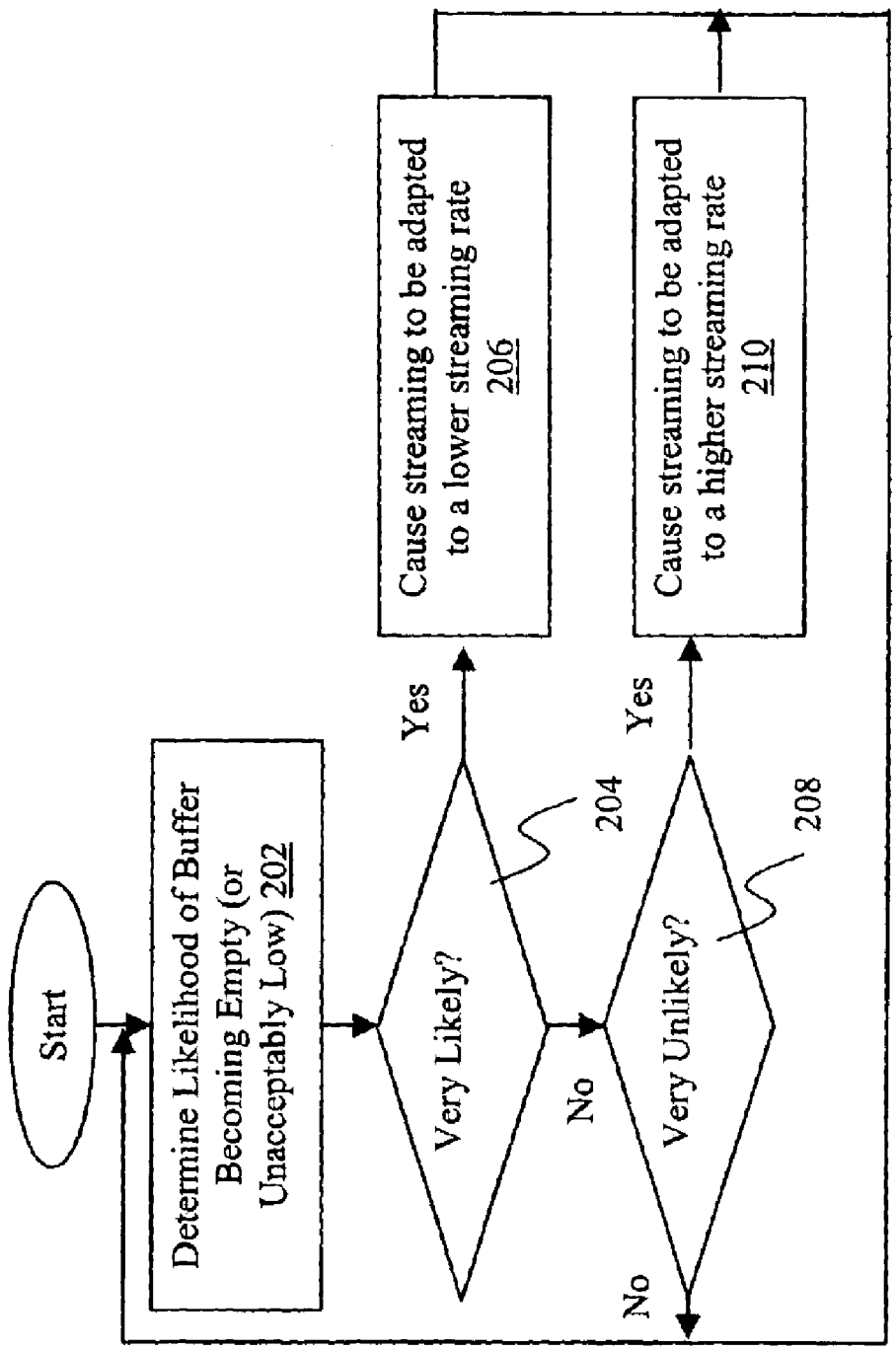
FIG. 2 illustrates a method view of the present invention, in accordance with one embodiment.

FIG. 2 illustrates a method view of the present invention, in accordance with one embodiment. As illustrated, at block 202, as described earlier, system 100 determines a likelihood of buffer 113 will become empty (or reaching the unacceptable low threshold). As alluded to earlier, this may be performed by either receiver device 112 or content provider 102. In the latter case, receiver device 112 provides feedback information to content provider, including in one embodiment, information that characterizes the arrival of packets into buffer 113 and their departure, i.e. removal of packets out of buffer 113. Content provider 102 makes the likelihood determination in turn based at least in part on the feedback information provided.

At block 204, upon determining the likelihood, system 100 examines the result to determine whether it indicates buffer 113 is very likely to become empty (or reaching the unacceptable low threshold). Similarly, this may be performed by either receiver device 112 or content provider 102. Typically, but not necessarily, it is performed by the same entity that performs the likelihood determination.

If the likelihood determination result indicates that buffer 113 is very likely to become empty (or reaching the unacceptable low threshold), system 100 causes the streaming rate to be dynamically adapted to a lower streaming rate, block 206. Thereafter, the process continues back at block 202. Again, the adaptation may be "initiated" by the receiver device 112 or the content provider 102. Typically, but not necessarily, it is performed by the same entity that assesses the likelihood determination result. In the former case, receiver device 112 may request the streaming rate be lower, or even suggest a lower streaming rate.

If the likelihood determination result does not indicate that buffer 113 is very likely to become empty (or reaching the unacceptable low threshold), at block 208, system 100 further determines whether it indicates buffer 113 is very unlikely to become empty (or reaching the unacceptable low threshold). Similarly, this may be performed by either receiver device 112 or content provider 102. Typically, but not necessarily, it is performed by the same entity that performs the likelihood determination.

If the likelihood determination result indicates that buffer 113 is very unlikely to become empty (or reaching the unacceptable threshold), for the embodiment, system 100 causes the streaming rate to be dynamically adapted to a higher streaming rate, block 210. Thereafter, the process continues back at block 202. Again, the adaptation may be "caused" by the receiver device 112 or the content provider 102. Typically, but not necessarily, it is performed by the same entity that assesses the likelihood determination result. In the former case, receiver device 112 may request the streaming rate be increased, or even suggest a higher streaming rate.

If the result of the likelihood determination neither indicates buffer 113 to be very likely to become empty (or reaching the unacceptable low threshold), or very unlikely to become empty (or reaching the unacceptable low threshold), system 100 repeats the process and continues the process back at block 202.

For the embodiment, the process is repeated continuously. In alternate embodiments, it may be repeated periodically with constant periods, or variable periods, depending on where the likelihood is trending.

Likelihood Determination

Figure 3A:
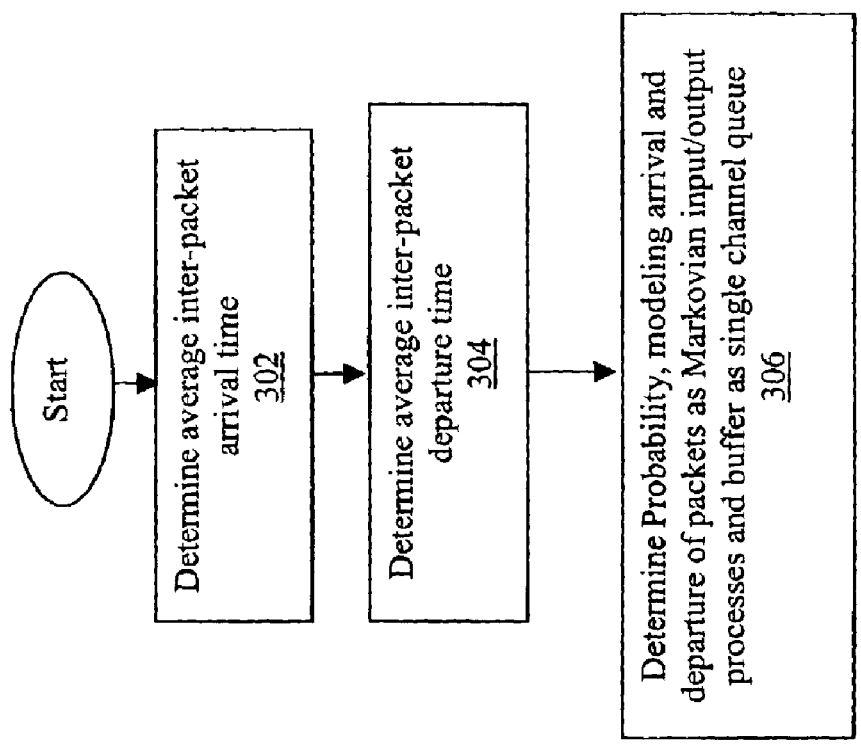
FIGS. 3a–3c illustrates a stochastic approach to determining the likelihood of the receiving buffer of the receiver device becoming empty (or reaching an unacceptable low threshold), in accordance with one embodiment.
Figure 3C:
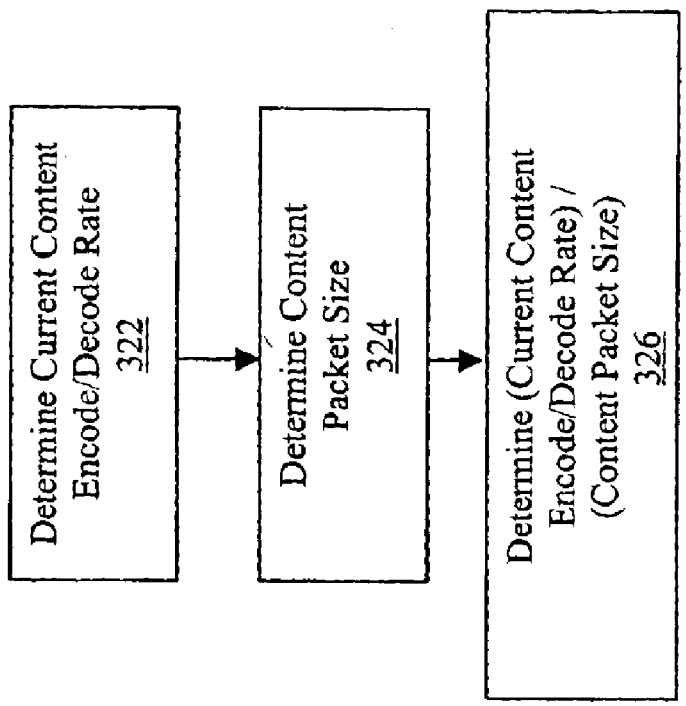
Figure 3B:
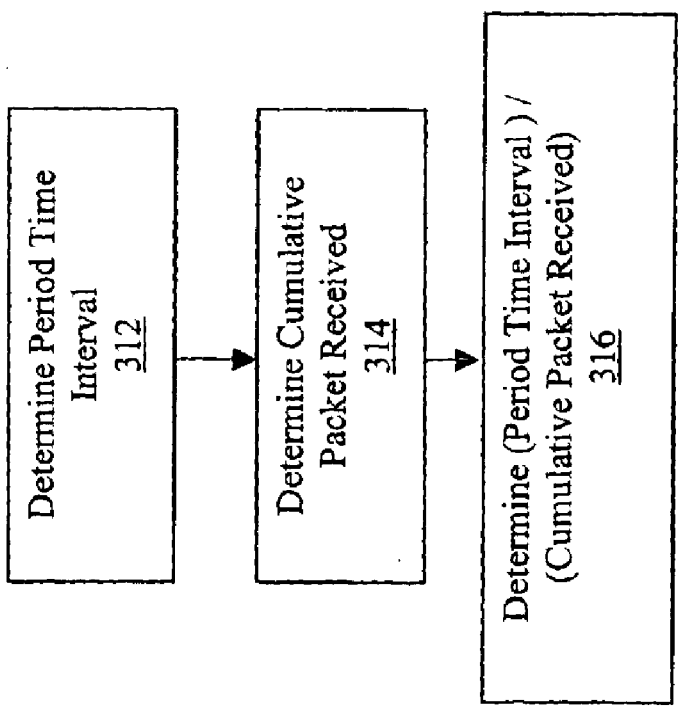

FIGS. 3a–3c illustrate the likelihood determination operation in further detail, in accordance with one embodiment. As described earlier, for the embodiment, a probability of buffer 113 becoming empty (or reaching the unacceptable low threshold) is computed. More specifically, the probability is computed employing a stochastic model, modeling the arrival of packets into buffer 113, and their departure, i.e. removal of packets, from buffer 113 as Markovian input and output processes respectively, with buffer 113 being modeled as a single channel queue. In other words, the buffer process is modeled as a M/M/1 queue, in the terminology of queuing theory. As described earlier, in alternate embodiments, the buffer may be modeled employing other modeling techniques.

Thus, at block 302 of FIG. 3a, system 100 first determines the average inter-packet arrival time. One embodiment of this determination is illustrated in FIG. 3b.

As described before, this may be performed by either receiver device 112 or content provider 102. In one embodiment, regardless of whether the operation is performed by receiver device 112 or content provider 102, receiver device 112 is equipped to monitor, i.e. observe the arrival of packets into buffer 113. In one embodiment, receiver device 112 is equipped to report the cumulative packet received to content provider 102. In one embodiment, receiver device 112 makes the report in accordance with the RTP Control Protocol (RTCP) [RFC 1889, Internet Engineering Task Force]. In one embodiment, more specifically, the embodiment of FIG. 3b, where content provider 102 computes the probability, content provider 102 determines the inter-packet arrival time by computing (block 326) the quotient of:

(Period Time Interval)/(Cumulative Packets Received)   (1)

In one embodiment, "Period Time Interval" is the amount of time elapsed between two receiver reports (RR) provided by receiver device 112 in accordance with RTCP, block 322. In one embodiment, the number of packets received for the period is determined by the number of packets transmitted less the number of packets lost, block 324. The number of packets transmitted during the "period" is determined based on the difference between the "highest sequence numbers" of two successive RR (402 of FIG. 4), and the number of packet loss during the period is determined based on the difference between the cumulative number of packets loss (404 of FIG. 4) reported in the two successive RR.

Referring back to FIG. 3a, for the embodiment, upon determining average inter-packet arrival time, system 100 determines the average inter-packet departure time, block 304. One embodiment of this determination is illustrated in FIG. 3c.

As described before, this may be performed by either receiver device 112 or content provider 102. In one embodiment, the average inter-packet departure time is determined by computing (block 326) the quotient of:

(Current Content Encode/Decode Rate)/(Content Packet Size)   (2)

The Current Content Encode/Decode Rate and the Content Packet Size are determined at blocks 322 and 324 respectively. As part of the content streaming process, both quantities are readily available to content provider as well as receiver devices 102 and 112.

Continuing with FIG. 3a again, at block 306, system 100 computes a probability of buffer 113 becoming empty (or reaching the unacceptable low threshold) using the earlier described average inter-packet arrival time, and average inter-packet departure time, in a stochastic model. More specifically, the stochastic model models the packet arrival into buffer 113 and removal from buffer 113 as Markovian input and output processes, and buffer 113 is modeled as a single channel queue. In other words, buffering of packet content is modeled as a M/M/1 queue in queuing theory terminology.

The probability of the single queue of a M/M/1 model becoming empty is computed as follows:

$$P0 = 1 - (l/m)$$

where P0 is the probability of the "queue" becoming empty, l=average inter-packet arrival time of content packets to the "queue", and m=average inter-departure time of content packets being removed from the "queue".

The probability of the single queue of a M/M/1 model reaching certain low threshold (t) may be similarly computed as follows:

$$P(n < t) = \sum_{n=0,1,\dots,t} (1 - (l/m))(l/m)^n$$

Advantage

Thus, it can be seen from the above description, the present invention is particularly adaptable to be implemented on the content provider. Moreover, the information required by the content provider may be derived from reports of standard protocols, such as RTCP. Further, the computation overhead is low.

Resultantly, for these embodiments, legacy receiver devices may be supported with little or no modifications. Further, updating content provider is significantly easier than updating a large number of receiver devices, rendering the present invention particularly scalable.

Article of Manufacture

Figure 5:
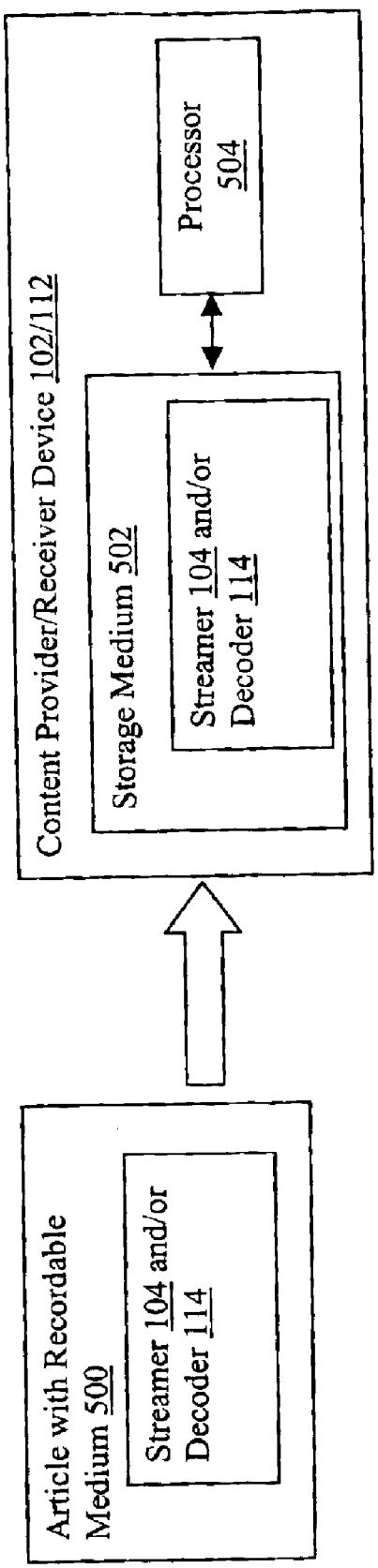
FIG. 5 illustrates an article of manufacture with a recordable medium having a software implementation of the present invention, designed for use to program a content provider and/or receiver device to equip the device with the present invention, in accordance with one embodiment.

FIG. 5 illustrates an article of manufacture including a recordable medium 500 having programming instructions implementing a software embodiment of the earlier described streamer 104 and/or decoder 114. Programming instructions implementing a software embodiment of streamer 104 and/or decoder 114 are designed for use to program a content provider or receiver device 102/112 to equip content provider or receiver device 102/112 with the capabilities of the present invention.

For the embodiment, content provider or receiver device 102/112 includes storage medium 502 to store at least a portion of a working copying of the programming instructions implementing the software embodiment of content provider or receiver device 102/112, and at least one processor 504 coupled to storage medium 502 to execute the programming instructions.

Content provider or receiver device 102/112 may be any one of the earlier enumerated example devices or other devices of the like. Article 500 may e.g. be a diskette, a compact disk (CD), a DVD or other computer readable medium of the like. In other embodiments, article 500 may be a distribution server distributing content provider or receiver device 102/112 on line, via private and/or public networks, such as the Internet. In one embodiment, article 500 is a web server.

CONCLUSION AND EPILOGUE

Thus, it can be seen from the above descriptions, an improved stochastic approach to adaptively stream content has been described.

While the present invention has been described in terms of the foregoing embodiments and example applications, those skilled in the art will recognize that the invention is not limited to the embodiments and example application described. The present invention can be practiced with modification and alteration within the spirit and scope of the appended claims.

Thus, the description is to be regarded as illustrative instead of restrictive on the present invention.

What is claimed is:

1. An apparatus comprising:
    storage medium having stored therein a plurality of programming instructions designed to determine a probability of a receiving buffer of a content receiving player device, receiving a content stream from a content providing device, reaching an unacceptable low threshold; and to cause a streaming rate of the content to be dynamically adapted based at least in part on the determined probability of the receiving buffer of the content receiving player device reaching the unacceptable low threshold; and
    at least one processor coupled to the storage medium to execute the programming instructions.

2. The apparatus of claim 1, wherein the programming instructions are designed to determine the probability, modeling arrival and departure of packets into and from the receiving buffer as Markovian input and output processes respectively, and the receiving buffer as a single channel queue.

3. The apparatus of claim 1, wherein the unacceptable low threshold equals empty, and the programming instructions are designed to determine the probability of the receiving buffer becoming empty by determining
    1—an utilization rate of the receiving buffer.

4. The apparatus of claim 3, wherein the programming instructions are further designed to determine the utilization rate of the receiving buffer by determining a ratio between an average inter-packet arrival time and an average inter-packet departure time for packets of the content stream arriving into and removed from the receiving buffer respectively.

5. The apparatus of claim 4, wherein
    the apparatus is the content receiving player device; and
    the programming instructions are further designed to monitor the arrival of packets of the content stream, and determine the average inter-packet arrival time of the content stream based at least in part on observations of said monitoring.

6. The apparatus of claim 4, wherein
    the apparatus is the content providing device; and
    the programming instructions are further designed to receive feedback information from the content receiving player device, the feedback information comprising cumulative packets received by the content receiving player device, and determine the average inter-packet arrival rate of the content stream at the content receiving player device, based at least in part on said cumulative packet received feedback information received from the content receiving player device.

7. The apparatus of claim 4, wherein the programming instructions are further designed to determine the average inter-packet departure time for removal of packets of the content stream from the receiving buffer at the content receiving player device for processing.

8. The apparatus of claim 7, wherein the programming instructions are further designed to determine the average inter-packet departure time based at least on part on a current coding rate of the content stream.

9. The apparatus of claim 7, wherein the programming instructions are further designed to determine the average inter-packet departure time based at least in part on a packet size.

10. The apparatus of claim 1, wherein
    the apparatus is the content providing device; and
    the programming instructions are further designed to receive feedback information from the content receiving player device, and determine the probability of the receiving buffer of the content receiving player device reaching the unacceptable low threshold, based at least in part on said feedback information received from the content receiving player device.

11. The apparatus of claim 1, wherein the programming instructions are further designed to cause streaming of the content to be dynamically adapted from a first streaming rate to a second streaming rate that is lower than the first streaming rate, whenever the probability is determined to be greater than a predetermined ceiling threshold.

12. The apparatus of claim 1, wherein the programming instructions are further designed to cause streaming of the content to be dynamically adapted from a first streaming rate to a second streaming rate that is higher than the first streaming rate, whenever the probability is determined to be smaller than a predetermined floor threshold.

13. The apparatus of claim 1, wherein
    the apparatus is the content receiving player device; and
    the programming instructions are further designed to monitor arrival and processing of packets of the content stream, and determine the probability of the receiving buffer reaching the unacceptable low threshold based at least in part on said monitoring.

14. The apparatus of claim 1, wherein
    the apparatus is the content providing device; and
    the programming instructions are further designed to receive feedback information from the content receiving player device, and determine the probability of the receiving buffer of the content receiving player device reaching the unacceptable low threshold, based at least in part on said received feedback information from the content receiving player device.

15. The apparatus of claim 1, wherein the apparatus is the content receiving player device, and the content receiving player device is a selected one from the group consisting of a palm sized computing device, a wireless mobile phone, a digital personal assistant, a laptop computing device, a desktop computing device, a set-top box, a server, a compact disk player, a digital versatile disk player, a television, and a display monitor.

16. The apparatus of claim 1, wherein the apparatus is the content receiving player device, and the content receiving player device is a selected one from the group consisting of a daughter card and a motherboard.

17. The apparatus of claim 1, wherein the apparatus is the content providing device.

18. An article of manufacture comprising:
a recordable medium; and
a plurality of programming instructions recorded therein to program an apparatus to enable the apparatus to determine a probability of a receiving buffer of a content receiving player device, receiving a content stream from a content providing device, reaching an unacceptable low threshold; and to cause a streaming rate of the content to be dynamically adapted based at least in part on the determined probability of the receiving buffer of the content receiving player device reaching the unacceptable low threshold.

19. The article of claim 18, wherein the programming instructions are designed to enable the apparatus to determine the probability of the receiving buffer of the content receiving player device reaching the unacceptable low threshold by modeling packet arrival into and removal from the receiving buffer as Markovian input and output processes respectively, and the receiving buffer as a single channel queue.

20. The article of claim 18, wherein the unacceptable low threshold equals empty, and the programming instructions are designed to enable the apparatus to determine an utilization rate of the receiving buffer by determining a ratio between an average inter-packet arrival time and an average inter-packet departure time of packets of the content stream arriving into and removed from the receiving buffer respectively, and then determine the probability of the receiving buffer becoming empty by determining
1—the utilization rate of the receiving buffer.

21. The article of claim 18, wherein the apparatus is the content receiving player device, and the programming instructions are further designed to enable the apparatus to notify a content providing device of the content stream whenever the probability is determined to be outside of an operating range.

22. The article of claim 18, wherein the apparatus is the content providing device, the programming instructions are further designed to enable the apparatus to cause streaming of the content to be dynamically adapted from a first streaming rate to a second streaming rate that is lower than the first streaming rate, whenever the probability is determined to be greater than a predetermined ceiling threshold.

23. The article of claim 18, wherein the apparatus is the content providing device, the programming instructions are further designed to enable the apparatus to cause streaming of the content to be dynamically adapted from a first streaming rate to a second streaming rate that is higher than the first streaming rate, whenever the probability is determined to be smaller than a predetermined floor threshold.

24. The article of claim 18, wherein
the apparatus is the content receiving player device; and
the programming instructions are further designed to enable the apparatus to monitor arrival of packets of the content stream into the receiving buffer, and removal of the packets from the receiving buffer for processing, and determine the probability of the receiving buffer reaching the unacceptable low threshold based at least in part on said monitoring.

25. The article of claim 18, wherein
the apparatus is the content providing device; and
the programming instructions are further designed to enable the apparatus to receive feedback information from the content receiving player device, and determine the probability of the receiving buffer of the content receiving player device reaching the unacceptable low threshold, based at least in part on said received feedback information from the content receiving player device.

26. In a content receiving player device, a method of operation, comprising:
successively receiving portions of a content stream provided at a first streaming rate from a content providing device;
successively buffering the received portions in a receiving buffer of the content receiving player device;
successively removing the buffered portions for processing on the content receiving player device;
at least periodically determining on the content receiving player device, a probability of the receiving buffer reaching an unacceptable low threshold; and
dynamically causing by the content receiving player device, the content stream to be provided at a second streaming rate that is different from the first streaming rate, based at least in part on the determined probability of the receiving buffer reaching the unacceptable low threshold.

27. The content receiving player device of claim 26, wherein said periodic determining of a probability of the receiving buffer of the content receiving player device reaching the unacceptable low threshold comprises modeling arrival of packets of the content stream into the receiving buffer and removal of the packets from the receiving buffer for processing as Markovian input and output processes respectively, and the receiving buffer as a single channel queue.

28. The content receiving player device of claim 26, wherein the unacceptable low threshold equals empty and said periodic determining of a probability of the receiving buffer of the content receiving player device becoming empty comprises periodic determining
1—an utilization rate of the receiving buffer.

29. The content receiving player device of claim 28, wherein said periodic determining of (1—an utilization rate of the receiving buffer) comprises periodic determining a ratio between an average inter-packet arrival time of the content stream into the receiving buffer and an average inter-packet departure time of removal of the packets from the receiving buffer for processing.

30. The content receiving player device of claim 29, wherein the method further comprises monitoring by the content receiving player device, the arrival of packets of the content stream into the receiving buffer, and said determining of a ratio comprises determining said average inter-packet arrival time based on observations of said monitoring.

31. The content receiving player device of claim 26, wherein said dynamic causing comprises the content receiving player device notifying a content providing device of the content stream, whenever the probability is determined to be outside of an operating range.

32. In a content providing device, a method of operation, comprising:
successively streaming a content in portions to a content receiving player device at a first streaming rate, the content receiving player device successively buffering the received portions in a receiving buffer of the content receiving player device, and successively removing the buffered portions for processing;
periodically determining by the content providing device, a probability of the receiving buffer of the content receiving player device reaching the unacceptable low threshold; and
dynamically adapting by the content providing device, the content stream to be provided at a second streaming rate that is different from the first streaming rate, based at least in part on the determined probability of the receiving buffer reaching the unacceptable low threshold.

33. The content providing device of claim 32, wherein said periodic determining comprises modeling arrival of packets of the content stream into the receiving buffer and removal of the packets from the receiving buffer for processing as Markovian input and output processes respectively, and the receiving buffer as a single channel queue.

34. The content providing device of claim 32, wherein the unacceptable low threshold equals empty and said periodic determining of a probability of the receiving buffer of the content receiving player device becoming empty comprises periodically determining
1—an utilization rate of the receiving buffer of the content receiving player device.

35. The content providing device of claim 34, wherein said periodic determining of (1—an utilization rate of the receiving buffer of the content receiving player device) comprises periodically determining a ratio between an average inter-packet arrival time of the content stream into the receiving buffer of the content receiving player device and an average inter-packet departure time of removal of the packets from the receiving buffer for processing.

36. The content providing device of claim 35, wherein the method further comprises receiving feedback information from the content receiving player device, with the feedback information including cumulative packets received by the content receiving player device, and said determining of a ratio comprises determining said average inter-packet arrival time based at least in part on said cumulative packets received feedback.

37. The content providing device of claim 32, wherein the method further comprises receiving feedback information from the content receiving player device, and said determining of a probability of the receiving buffer of the content receiving player device reaching the unacceptable low threshold comprises determining the probability based at least in part on at least a portion of said feedback information received.

38. The content providing device of claim 32, wherein said dynamic adapting of the streaming of the content from a first streaming rate to a second streaming rate comprises dynamically adapting the streaming of the content from the first streaming rate to a second streaming rate that is lower than the first streaming rate, whenever the probability is determined to be greater than a predetermined ceiling threshold.

39. The content providing device of claim 32, wherein said dynamic adapting comprises dynamically adapting by the content providing device, the streaming of the content from the first streaming rate to a second streaming rate that is higher than the first streaming rate, whenever the probability is determined to be lower than a predetermined floor threshold.

40. The content providing device of claim 32, wherein the method further comprises receiving feedback information from the content receiving player device, and said determining of a probability of the receiving buffer of the content receiving player device reaching the unacceptable low threshold comprises determining the probability based at least in part on at least a portion of said feedback information received.

41. In a system, a method of operation, comprising:
successively streaming a content in portions from a content providing device to a content receiving player device at a first streaming rate;
successively buffering the received portions in a receiving buffer at the content receiving player device;
successively removing the buffered portions from the receiving buffer for processing on the content receiving player device;
periodically determining by at least one of the content providing and the content receiving player device a probability of the receiving buffer of the content receiving player device reaching an unacceptable low threshold; and
the content providing device dynamically adapting provisioning of the content stream to a second streaming rate that is different from the first streaming rate, based at least in part on the determined probability of the receiving buffer reaching the unacceptable low threshold.

42. The system of claim 41, wherein said determining of a probability of the receiving buffer of the content receiving player device reaching the unacceptable low threshold comprises modeling packet arrival at the receiving buffer of the content receiving player device, and removal of the buffered packets from the receiving buffer for processing as Markovian input and output processes respectively, and the receiving buffer as a single channel queue.

43. The system of claim 41, wherein the unacceptable low threshold equals empty and said determining of a probability of the receiving buffer of the content receiving player device be coming empty comprises determining
1—an utilization rate of the receiving buffer of the content receiving player device.

44. The system of claim 41, wherein said dynamic adapting of the streaming of the content from a first streaming rate to a second streaming rate comprises dynamically adapting the streaming of the content from the first streaming rate to a second streaming rate that is lower than the first streaming rate, whenever the probability is determined to be greater than a predetermined ceiling threshold.

45. The system of claim 41, wherein said dynamic adapting of the streaming of the content from a first streaming rate to a second streaming rate comprises dynamically adapting the streaming of the content from the first streaming rate to a second streaming rate that is higher than the first streaming rate, whenever the probability is determined to be lower than a predetermined ceiling threshold.

46. The system of claim 41, wherein said content providing device performs said unacceptable low threshold probability determination for the receiving buffer of the content receiving player device, and the method further comprises the content receiving player device providing the content providing with feedback information, on which the content providing device bases its unacceptable low threshold probability determination of the receiving buffer of the content receiving player device at least in part.

* * * * *